(12) United States Patent
Morita et al.

(10) Patent No.: US 7,863,399 B2
(45) Date of Patent: Jan. 4, 2011

(54) CURING SILICONE COMPOSITION AND CURED PRODUCT THEREOF

(75) Inventors: Yoshitsugu Morita, Ichihara (JP); Minoru Isshiki, Ehime (JP); Hiroshi Ueki, Ichihara (JP); Hiroji Enami, Ichihara (JP)

(73) Assignee: Dow Corning Toray Company, Ltd, Tokyo (JP)

( * ) Notice: Subject to any disclaimer, the term of this patent is extended or adjusted under 35 U.S.C. 154(b) by 816 days.

(21) Appl. No.: 10/584,655

(22) PCT Filed: Dec. 20, 2004

(86) PCT No.: PCT/JP2004/019489

§ 371 (c)(1),
(2), (4) Date: Jul. 6, 2007

(87) PCT Pub. No.: WO2005/063843

PCT Pub. Date: Jul. 14, 2005

(65) Prior Publication Data

US 2007/0282058 A1   Dec. 6, 2007

(30) Foreign Application Priority Data

Dec. 26, 2003   (JP)   ............... 2003-433628

(51) Int. Cl.
*C08G 77/00*   (2006.01)
(52) U.S. Cl. .............. 528/43; 528/12; 528/403
(58) Field of Classification Search .......... 528/43
See application file for complete search history.

(56) References Cited

U.S. PATENT DOCUMENTS

| | | | |
|---|---|---|---|
| 4,584,342 A | | 4/1986 | Kondow |
| 5,114,994 A | * | 5/1992 | Ito et al. ............ 523/436 |
| 6,706,405 B2 | * | 3/2004 | Sanders et al. ........ 428/413 |
| 6,709,753 B2 | * | 3/2004 | Honda et al. .......... 428/447 |

FOREIGN PATENT DOCUMENTS

| | | |
|---|---|---|
| EP | 0567079 A1 | 10/1993 |
| JP | 60179417 | 9/1985 |
| JP | 3277619 | 12/1991 |
| JP | 5295084 | 11/1993 |
| JP | 6306084 | 11/1994 |
| JP | 7022441 | 1/1995 |
| JP | 7118365 | 5/1995 |
| JP | 7161740 | 6/1995 |
| JP | 10130465 | 5/1998 |
| JP | 10147764 | 6/1998 |
| JP | 10163232 | 6/1998 |

OTHER PUBLICATIONS

English language abstract for JP3277619 extracted from espacenet.com Jan. 11, 2007.
English language abstract for JP5295084 extracted from espacenet.com Jan. 11, 2007.
English language abstract for JP7022441 extracted from espacenet.com Jan. 11, 2007.
English language abstract for JP7161740 extracted from espacenet.com Jan. 11, 2007.
English language abstract for JP10130465 extracted from espacenet.com Jan. 11, 2007.
English language abstract for JP10147764 extracted from espacenet.com Jan. 11, 2007.
English language abstract for JP10163232 extracted from espacenet.com Jan. 11, 2007.
English language abstract for JP60179417 extracted from espacenet.com Jan. 11, 2007.
English language abstract for JP6306084 extracted from espacenet.com Jan. 11, 2007.
English language abstract for JP7118365 extracted from espacenet.com Jan. 11, 2007.

* cited by examiner

*Primary Examiner*—Randy Gulakowski
*Assistant Examiner*—Lindsay Nelson
(74) *Attorney, Agent, or Firm*—Howard & Howard Attorneys PLLC

(57) ABSTRACT

A curable silicone composition comprising: (A) an organopolysiloxane that has a branched molecular structure and contains in one molecule at least two univalent hydrocarbon groups with phenolic hydroxyl groups therein; (B) a linear-chain organopolysiloxane having at least two univalent hydroxyl groups with epoxy groups that are free of aromatic rings; and (C) a curing accelerator.

19 Claims, No Drawings

CURING SILICONE COMPOSITION AND CURED PRODUCT THEREOF

RELATED APPLICATIONS

This application claims priority to and all the advantages of International Patent Application No. PCT/JP2004/019489, filed on Dec. 20, 2004, which claims priority to Japanese Patent Application No. JP2003-433628, filed on Dec. 26, 2003.

FIELD OF THE INVENTION

The present invention relates to a curable silicone composition and, more particularly, to a curable silicone composition that possesses excellent curability and produces, after curing, a cured product of excellent flexibility and suitability for adhesive connection. The invention also relates to cured products obtained from the aforementioned composition.

BACKGROUND OF THE INVENTION

Known curable resin compositions such as, e.g., epoxy resin compositions used for manufacturing parts of electronic devices, seals for electronic and electrical elements, adhesive agents, etc., are characterized by a high modulus of elasticity and stiffness in the cured state. Therefore, when such a resin is cured, the electronic and electric devices sealed with the use of the aforementioned resin develop high stress caused by thermal expansion of the resin. Such stress, in turn, causes bowing in electrical and electronic elements and substrates, formation of cracks in the cured resin itself, deterioration in the electronic and electrical parts, or formation of gaps between the parts and the cured resin.

In order to reduce the stress in a cured resin, it has been proposed to prepare a curable resin composition by combining the aforementioned curable resins with epoxy-containing silicone resins (see. Japanese Unexamined Patent Application Publication (hereinafter referred to as (Kokai) H5-295084 equivalent to EP0567079A1), a die-attach paste that is a product of a reaction between an epoxy resin, cyanate resin, and an epoxy-containing dimethylsiloxane compound (Kokai 10-147764; Kokai 10-163232), a die-bonding material obtained as a result of a reaction between an epoxy-containing silicone and phenol-type organic compound (Kokai H7-22441, Kokai H7-118365, Kokai H10-130465), etc. However, the aforementioned compounds produce a stress-release effect that is still insufficient, and therefore these compounds have found only limited application in electrical and electronic parts.

It is known that products obtained from curable silicone compositions are characterized by excellent dielectric properties, volumetric resistivity, resistance to insulation breakdown, etc. From the point of view of these electrical properties, the curable silicone compositions are attractive for use in electrical parts, electrical and electronic seals, adhesives, and the like. On the other hand, products obtained by curing the curable silicone compositions are soft and are characterized either by a high coefficient of thermal expansion or low strength and modulus of elasticity with insufficient protective capacity for electronic and electrical parts, as well as by low resistance to externally applied impact forces. Furthermore, low adhesiveness of the cured products to electrical and electronic parts and elements, results in the formation of gaps between the cured resin and the surfaces of the aforementioned parts and elements. In order to reduce coefficients of thermal expansion inherent in soft cured bodies, their compositions are combined with fillers. However, addition of the fillers sharply increases modulus of elasticity, so that the molded products loose their softness and flexibility. Thus, the improvement effects are very limited.

Furthermore, Kokai H6-306084 describes a short-time-gelation curable silicone composition composed of an epoxy-modified silicone oil and a phenol-modified silicone oil. However, this resin composition is inferior to others in curability and requires longer time for curing.

DISCLOSURE OF THE INVENTION

It is an object of the present invention to provide a curable silicone composition that is characterized by rapid curing and produces a cured product of excellent flexibility and adhesiveness. It is another object to provide a cured product obtained from the aforementioned composition.

The present invention relates to a curable silicone composition comprising: (A) an organopolysiloxane that has a branched molecular structure and contains in one molecule at least two univalent hydrocarbon groups with phenolic hydroxyl groups therein; (B) a linear-chain organopolysiloxane having at least two univalent hydroxyl groups with epoxy groups that are free of aromatic rings; (C) a curing accelerator, and, if necessary, (D) a filler.

DESCRIPTION OF A PREFERRED EMBODIMENT OF THE INVENTION

A curable silicone composition of the invention will be now described in more detail.

Component (A) is a major component of the composition of the invention. Phenolic hydroxyl groups of this component interact with epoxy groups of component (B), form cross-linking bonds with them, and provide curing.

Component (A) is an organopolysiloxane that has a branched molecular chain structure and contains in one molecule at least two univalent hydrocarbon groups that have phenolic hydroxyl groups. The branched molecular chain structure may be a partially-branched, branched, net-like, or a three-dimensional molecular structure and should contain in one molecule at least one $[RSiO_{3/2}]$ unit or a $[SiO_{4/2}]$ unit. In these formulae, R designates a $C_{1-20}$ organic group. Preferable univalent hydrocarbon groups with phenolic hydroxyl groups can be represented by hydroxyphenylpropyl or similar phenol-bonded alkyl groups, examples of which are given below:

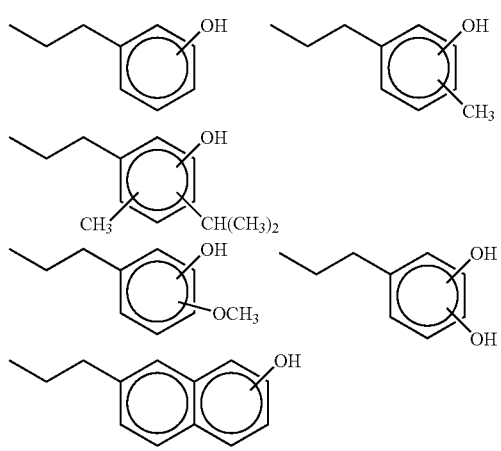

-continued

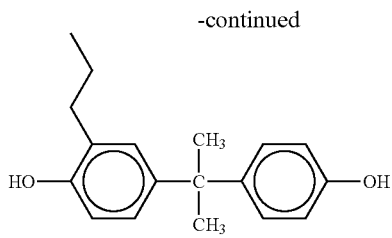

The silicone-bonded $C_{1-20}$ organic groups other than univalent hydrocarbon groups with phenolic groups may be comprised of $C_{1-20}$ univalent hydrocarbon groups or halogen-substituted univalent hydrocarbon groups. The following are examples of such groups: methyl, ethyl, propyl, butyl, pentyl, or similar alkyl groups; phenyl, tolyl, xylyl, or similar aryl groups; benzyl, phenethyl, or similar aralkyl groups; chloromethyl, 3,3,3-trifluoropropyl, or similar halogen-substituted alkyl groups. Of these, most preferable are alkyl groups, in particular, methyl groups. In order to improve adhesiveness to substrates, the composition may contain alkoxyalkyl groups. Such alkoxysilylalkyl groups may be comprised of trialkoxysilylalkyl groups having alkoxy groups in the form of $C_{1-4}$ alkoxy groups and alkyl groups in the form of $C_{2-6}$ alkyl groups. Specific examples of such groups are trimethoxysilylethyl groups, triethoxysilylethyl groups, methyldimethoxysilylethyl groups, trimethoxysilylpropyl groups, triethoxysilylpropyl groups, trimethoxysilylbutyl groups, and methyldimethoxysilylpropyl groups.

Component (A) may be comprised of an organopolysiloxane of one type or may be comprised of a mixture of organopolysiloxanes of two or more different types. At 25° C., this component may be liquid or solid. If it is solid, it may be uniformly mixed with other components by utilizing an organic solvent or heating. In order to facilitate compounding and handling, the liquid state at 25° C. is preferable. It is recommended that component (A) have a weight-average molecular weight within the range of 500 to 50,000, preferably 750 to 5000.

It is recommended that a phenol-equivalent quantity of component (A) {which is equal to the weight-average molecular weight of component (A) divided by the number of phenolic hydroxyl groups in one molecule of component (A)} be within the range of 150 to 5000, preferably within the range of 150 to 1000, and even more preferably between 150 and 500. If the aforementioned phenol-equivalent quantity is below the lower recommended limit, the product molded from the present composition may not be sufficiently flexible. If, on the other hand, the quantity exceeds the upper recommended limit, the composition may have lower adhesiveness and curability, while the cured bodies will become very brittle.

An example of a preferred component (A) is the one represented by the following silicone unit formula (1):

$$[R^1{}_3SiO_{1/2}]_a [R^2{}_2SiO_{2/2}]_b [R^3SiO_{3/2}]_c \quad (1)$$

In this formula, $R^1$, $R^2$, and $R^3$ are $C_{1-20}$ organic groups, of which preferable are those that have in one molecule at least two univalent hydrocarbon groups with phenolic hydroxyl groups; <<a+b+c=1>>; on average, <<a>>, <<b>>, and <<c>> satisfy the following condition: <<0≦a≦0.8>>, <<0≦b≦0.8>>, and <<0.2≦c≦1.0>>. $C_{1-20}$ organic groups other than the univalent hydrocarbon groups with phenolic hydroxyl groups may be comprised of $C_{1-20}$ univalent hydrocarbon groups or halogen-substituted univalent hydrocarbon groups. Such univalent hydrocarbon groups or halogen-substituted univalent hydrocarbon groups and univalent hydrocarbon groups with phenolic hydroxyl groups may be the same as described earlier. The organopolysiloxane represented by the aforementioned siloxane-unit formula (1) may be exemplified by those composed only of $[R^3SiO_{3/2}]$ units; $[R^1{}_3SiO_{1/2}]$ and $[R^3SiO_{3/2}]$ units; $[R^2{}_2SiO_{2/2}]$ and $[R^3SiO_{3/2}]$ units; and $[R^1{}_3SiO_{1/2}]$, $[R^2{}_2SiO_{2/2}]$, and $[R^3SiO_{3/2}]$ units.

In order to improve strength of cured bodies obtained by curing the present composition, it is recommended that $R^3$ contain aryl groups in an amount exceeding 20 mole %, preferably more than 50 mole %, and even more preferably more than 80 mole %. Preferably aryl groups of $R^3$ are phenyl groups. <<a>>, <<b>>, and <<c>> are mole numbers of respective silicone units, so that <<a+b+c>> is equal to 1. It is preferable that <<a+b≠0>>. This is because without this condition, component (A) will consist only of units $[R^3SiO_{3/2}]$, become very viscous, and will be difficult to handle. On average, <<a>> should satisfy following condition: <<0≦a≦0.8>>, preferably, <<0<a≦0.8>>, and more preferably <<0.3≦a≦0.6>>. The value of <<a>> exceeding the upper recommended limit will diminish the molecular weight of the organopolysiloxane, so that component (A) will bleed to the surface of a cured body and contaminate the surroundings. On average, <<b>> should satisfy following condition: <<0≦b≦0.8>>, preferably, <<0≦b≦0.6>>. The value of <<b>> exceeding the upper recommended limit will make a cured body obtained from the present composition too brittle. On average, <<c>> should satisfy following condition: <<0.2≦c≦1.0>>, preferably, <<0.4<c≦1.0>>. The value of <<c>> below the lower recommended limit will not allow obtaining sufficient adhesiveness and will make the cured body too brittle. If, on the other hand, the value of <<c>> exceeds the upper recommended limit, the composition will become too viscous and will be difficult to handle during preparation of the composition, while the cured body will not have the required flexibility.

Examples of preferred components (A) represented by the siloxane unit formula (1) are given below. In the following formulae, <<a>>, <<b>>, and <<c>> are the same as defined above, <<a>> and <<b>> are not equal to 0; <<x>> and <<y>> satisfy the following conditions: <<0.2≦x<1.0>>, <<0<y<0.2>>, <<x+y=c>>; and <<Z>> is a 3-(m-hydroxyphenyl) propyl group.

$[Z(CH_3)_2SiO_{1/2}]_a [C_6H_5SiO_{3/2}]_c$ $[Z(CH_3)_2SiO_{1/2}]_a [(CH_3)_2SiO_{2/2}]_b [C_6H_5SiO_{3/2}]_c$ $[ZCH_3SiO_{2/2}]_b [C_6H_5SiO_{3/2}]_c$ $[Z(CH_3)_2SiO_{1/2}]_a [C_6H_5SiO_{3/2}]_x [CH_3SiO_{3/2}]_y$ $[C_6H_5SiO_{3/2}]_x [ZSiO_{3/2}]_y$

Component (A) represented by the aforementioned siloxane unit of formula (1) may be prepared, e.g., by subjecting a phenol compound with unsaturated aliphatic groups and a phenyltrichlorosilane and phenyltrialkoxysilane, co-hydrolyzed in the presence of a dimethylchlorosilane or a similar organosilane having silicon-bonded hydrogen atoms, to an addition reaction in the presence of a hydrosilation catalyst, or by subjecting a phenol compound with unsaturated aliphatic groups and an organopolysiloxane having silicon-bonded hydrogen atoms and prepared by co-hydrolyzation of a phenyltrichlorosilane and phenyltrialkoxysilane in the presence of a dimethylchlorosilane and monomethylchlorosilane to an addition reaction in the presence of a hydrosilation catalyst.

Another specific example of favorable (A) component is an organopolysiloxane expressed by the following siloxane unit formula (2):

$$[R^4_3SiO_{1/2}]_d [R^5_2SiO_{2/2}]_e [SiO_{4/2}]_f \qquad (2)$$

In this formula, $R^4$ and $R^5$ are $C_{1-20}$ organic groups, of which preferable are those that have at least two univalent hydrocarbon groups with phenolic hydroxyl groups; <<d+e+f=1>>; on average, <<d/f>> satisfies the following condition: <<0.02≦d/f≦4>>, on average, <<d>> satisfies the following condition: <<0<d≦0.8>>; on average, <<e>> satisfies the following condition: <<0≦e≦0.98>>; on average, <<f>> satisfies the following condition: <<0.002≦f≦0.98. Groups other than the aforementioned univalent hydrocarbons with phenolic hydroxide groups may be comprised of $C_{1-20}$ univalent hydrocarbon groups. These univalent hydrocarbon groups, as well as the univalent hydrocarbon groups with phenolic hydroxyl groups are the same as defined above. For example, an organopolysiloxane represented by the aforementioned siloxane unit formula (2) may consist of $[R^4_3SiO_{1/2}]$ and $[SiO_{4/2}]$ units; or $[R^4_3SiO_{1/2}]$, $[R^5_2SiO_{2/2}]$, and $[SiO_{4/2}]$ units.

<<d>>, <<e>>, and <<f>> are average mole numbers of respective silicone units the total number of which is 1. In other words, <<d+e+f>> is equal to 1. On average, <<d>> should satisfy the following condition: <<0<d≦0.8>>, preferably, <<0.2≦d≦0.8>>, and more preferably <<4≦d≦0.8>>. The value of <<d>> exceeding the upper recommended limit will diminish the molecular weight of the organopolysiloxane, so that component (A) will bleed to the surface of a cured body and contaminate the surroundings. On average, <<e>> should satisfy following condition: <<0≦e≦0.98>>, preferably, <<0≦e≦0.6>>, and even more preferably <<0≦e≦0.2>>. The value of <<e>> exceeding the upper recommended limit will make a cured body obtained from the present composition too brittle. On average, <<f>> should satisfy following condition: <<0.002≦f≦0.98>>, preferably, <<0.1≦f≦0.8>>, and more preferably 0.2≦f≦0.6. The value of <<f>> below the lower recommended limit will not allow obtaining a sufficient adhesiveness and will make the cured body too brittle. If, on the other hand, the value of <<f>> exceeds the upper recommended limit, the composition will become too viscous and will be difficult to handle during preparation of the composition, while the cured body will not have the required flexibility. On average, <<d/f>> should satisfy the following condition: <<0.02≦d/f≦4>>, preferably <<0.2≦d/f≦4>>. If this ratio is below the recommended lower limit, it will be difficult to handle the composition in the manufacturing processes, and the cured body will have low flexibility. On the other hand, the ratio of $[R^4_3SiO_{1/2}]$ units to $[SiO_{4/2}]$ units should not be greater than 4.

Examples of preferred components (A) represented by the siloxane unit formula (2) are given below. In the following formulae, <<d>>, <<e>>, and <<f>> are the same as defined above, <<e>> is not equal to 0; <<p+q=d>>; <<r+s=e>>, and <<Z>> is a 3-(m-hydroxyphenyl) propyl group.

$[Z(CH_3)_2SiO_{1/2}]_d [SiO_{4/2}]_f$ $[Z(CH_3)_2SiO_{1/2}]_p [(CH_3)_3SiO_{1/2}]_q [SiO_{4/2}]_f$ $[Z(CH_3)_2SiO_{1/2}]_d [CH_3]_2SiO_{2/2}]_e [SiO_{4/2}]_f$ $[Z(CH_3)_2SiO_{1/2}]_p [(CH_3)_3 SiO_{1/2}]_q [(CH_3)_2 SiO_{2/2}]_e [SiO_{4/2}]_f$ $[Z(CH_3)_2SiO_{1/2}]_p [(CH_3)_3 SiO_{1/2}]_q [(CH_3)_2 SiO_{2/2}]_r [(C_6H_5)(CH_3) SiO_{2/2}]_s [SiO_{4/2}]_f$

Component (A) represented by the aforementioned siloxane unit of formula (2) may be prepared, e.g., by subjecting a phenol compound with unsaturated aliphatic groups and an organopolysiloxane that has silicon-bonded hydrogen atoms and is prepared by a method known in the art to an addition reaction in the presence of a hydrosilation catalyst. More specifically, the process may consist of subjecting a phenol compound that has unsaturated aliphatic groups and an organopolysiloxane that has silicon-bonded hydrogen atoms and is prepared by co-hydrolyzation with tetramethoxysilane in the presence of an organosilane with silicon-bonded hydrogen atoms, such as a dimethylchlorosilane, to an addition reaction in the presence of a hydrosilation catalyst. Another method may consists of subjecting a phenol compound that has unsaturated aliphatic groups and an organopolysiloxane that has silicon-bonded hydrogen atoms and that is prepared by co-hydrolyzation with a tetramethoxysilane in the presence of a hexamethyldisiloxane and an organosilane with silicon-bonded hydrogen atoms, such as a dimethylchlorosilane, to an addition reaction in the presence of a hydrosilation catalyst. Still another method may consist of subjecting a phenol compound that has unsaturated aliphatic groups and an organopolysiloxane that has silicon-bonded hydrogen atoms and that is prepared by co-hydrolyzation with a tetramethoxysilane in the presence of a monomethylchlorosiloxane and a dimethylchlorosilane to an addition reaction in the presence of a hydrosilation catalyst.

Another example is a preparation method that consists of subjecting the fine-powdered silica that has on its surface silanol groups to surface treatment with a dimethylchlorosilane and then carrying out an addition reaction of the treated production with a phenol compound that has unsaturated aliphatic groups in the presence of a hydrosilation catalyst.

Component (B), which is a linear-chain organopolysiloxane with at least two univalent hydrocarbon groups having epoxy groups free of aromatic rings, interacts with component (A) and, under effect of a below-described component (C) which is a cross-linking agent of component (A), reacts with the phenolic hydroxyl groups of component (A) to cross-link and cure the composition of the invention. The following are examples of preferred univalent hydrocarbon groups having epoxy groups free of aromatic rings: 2-glycidoxyethyl, 3-glycidoxypropyl group, 4-glycidoxybutyl, 2-(3,4-epoxycyclohexyl) ethyl, 3-(3,4-epoxycyclohexyl) propyl, 2-(3,4-epoxynorbornenyl) ethyl, 2-(3,4-epoxy-3-methylcyclohexyl) -2-methylethyl, or similar epoxy-containing alkyl groups. Of these, most preferable are 3-glycidoxypropyl and 2(3,4-epoxycyclohexyl) ethyl groups. Two or more of the aforementioned univalent hydrocarbon groups with aromatic-ring-free epoxy groups may be contained in one molecule. Groups of component (B) other than the aforementioned univalent hydrocarbon groups without aromatic-rings epoxy groups may be comprised of $C_{1-20}$ hydrocarbon groups or halogen-substituted univalent hydrocarbon groups, such as methyl, ethyl, propyl, butyl, pentyl, hexyl, heptyl, or similar alkyl groups; phenyl, tolyl, xylyl, naphthyl, or similar aryl groups; benzyl, phenethyl, or similar aralkyl groups; vinyl, aryl, butenyl, pentenyl, hexenyl, or similar alkenyl groups; chloromethyl, 3-chloropropyl, 3,3,3-trifluoropropyl, or similar halogenated alkyl groups. Of these, most preferable are alkyl groups, especially methyl groups.

Component (B) may contain a small number of silicone-bonded hydrogen atoms, hydroxyl groups, and/or alkoxy groups. This component may be solid or liquid at 25° C., but the liquid state is more convenient for handling and therefore is preferable. More specifically, it is recommended that component (B) has viscosity of 1 to 1,000,000 mPa·s, preferably 100 to 5,000 mPa·s at 25° C. If viscosity is below the lower recommended limit, the obtained cured object will have poor flexibility and low mechanical strength. If, on the other hand, viscosity exceeds the upper recommended limit, it will be difficult to handle the composition during production.

Preferred component (B) is represented by structural formula (3) given below. A cured object made from the composition with component (B) corresponding to this formula will have an improved flexibility.

$$R^7{}_3SiO(R^8{}_2SiO)_mSiR^7{}_3 \qquad (3).$$

In the above formula, $R^7$ and $R^8$ are $C_{1-20}$ organic groups such as univalent hydrocarbon groups, at least two of which are univalent hydrocarbon groups with aromatic-ring-free epoxy groups. Although the number of the aforementioned univalent hydrocarbon groups with aromatic-ring-free epoxy groups may contain more than two, provision of only two such groups is preferable. Organic groups other than the univalent hydrocarbon groups with aromatic-ring-free epoxy groups may be comprised of $C_{1-20}$ univalent hydrocarbon groups or halogen-substituted univalent hydrocarbon groups. The univalent hydrocarbon groups with aromatic-ring-free epoxy groups and aforementioned other groups are the same as those described earlier. In formula (3), <<m>> is an integer within the range of 0 to 1000, preferably between 0 and 100, and even more preferably 0 to 20. If <<m>> in the above formula is within the recommended range, component (B) is maintained at sufficiently low viscosity that will facilitate compounding with component (A) and will allow liquation of the curable silicone compounds of the invention with non-solvents.

Component (B) can be added in an amount that maintains a mole ratio of the epoxy groups of component (B) to phenolic hydroxyl groups of component (A) in the range of 0.2 to 5, preferably 0.3 to 2.5, and even more preferably 0.8 to 1.5. If the aforementioned ratio of the epoxy groups of component (B) to phenolic hydroxyl groups of component (A) is lower than 0.2, it will be difficult to provide sufficient curing of the composition. If, on the other hand, the above ratio exceeds 5, a cured body obtained from the composition will have low mechanical properties.

Preferable examples of component (B) are given below. In the following formulae, <<n>> is an integer between 1 and 20, <<t>> is an integer between 2 and 10, X is a 3-glycidocypropyl group or 2-(3,4-epoxycyclohexyl) ethyl group.

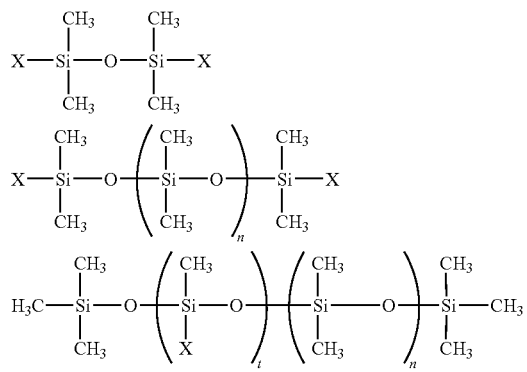

Component (B) can be prepared by a known method. For example, it can be produced by causing an addition reaction conducted in the presence of a hydrosilation catalyst between an epoxy compound that contains alkenyl groups but is free of aromatic rings and an organopolysiloxane that has silicon-bonded hydrogen atoms.

Component (C) is the one that accelerates the reaction between phenolic hydroxyl groups of component (A) and epoxy groups of component (B) and thus accelerates curing. Component (C) may be exemplified by tertiary amine compounds, organic salts of aluminum, zirconium, or the like, phosphine or other organic phosphorous compounds, heterocyclic amine compounds, boron complexes, organic ammonium salts, organic sulfonium salts, organic peroxides, or products of their reactions, etc. The following are examples of component (C): triphenylphosphine, tributylphosphine, tri(p-methylphenyl) phosphine, tri(nonylphenyl) phosphine, triphenylphosphine-triphenylborate, tetraphenylphosphine-tetraphenylborate, or similar phosphorous compounds; triethylamine, benzyldimethylamine, α-methylbenzyldimethylamine, 1,8-diazabicyclo [5.4.0] undecene-7, or other tertiary amines; 2-methylimidazole, 2-phenylimidazole, 2-phenyl-4-methylimidazole, or similar imidazole compounds. In order to extend the service life of the curable silicone compound of the invention, the curing accelerator can be used in an encapsulated form. An encapsulated curing accelerator is commercially produced as an encapsulated amine catalysts that is comprised of an amine catalyst in a capsule of a bisphenol-A type epoxy resin (a product of Asahi Chemical Industry Co., Ltd., trademark HX-3088).

There are no special restrictions with regard to the amount in which component (C) can be added, provided that it is sufficient for curing the composition. It is preferably to use it in an amount of 0.01 to 50 parts by weight, preferably 0.1 to 5 parts by weight per 100 parts by weight of component (A).

In order to impart stickiness to the composition of the invention and to improve strength of the cured product, the composition can be additionally combined with a filler (D). Such a filler can be represented by glass fibers, alumina fibers, ceramic fibers composed of alumina and silica components, boron fibers, zirconia fibers, silicon carbide fibers, metal fibers, or similar fibrous fillers; fused silica, crystalline silica, precipitated silica, fumed silica, calcined silica, zinc oxide, calcined clay, carbon black, glass beads, alumina, talc, calcium carbonate, clay, aluminum hydroxide, magnesium hydroxide, barium sulfide, aluminum carbide, boron carbide, silicon carbide, aluminum oxide, magnesium oxide, titanium oxide, berilium oxide, kaolin, mica, zirconia, or similar powdered fillers; these fillers can be used in combinations of two or more. There are no restrictions with regard the shape and average particle size, but best moldability can be achieved with a spherical silica having an average diameter of particles within the range of 0.1 to 40 μm.

In order to maintain the compound in a flowable state, component (D) should be added in an amount of 0 to 2000 parts by weight, preferably 50 to 1000 parts by weight per 100 parts by weight of the sum of components (A) and (B).

Furthermore, in order to improve dispersibility of component (D) in components (A), (B), or their mixture, as well as in order to improve adhesion of the composition to a substrate during curing, the composition may additionally incorporate silane coupling agents, titanate coupling agents, or similar coupling agents. Such coupling agents can be exemplified by 3-glycidoxypropyl trimethoxysilane, 3-glycidoxypropyl diethoxysilane, 2-(3,4-epoxychlorohexyl) ethyltrimethoxysilane, or a similar epoxy-containing alkoxysilane; N-(2-aminoethyl)-3-aminopropyltrimethoxysilane, 3-aminopropyltriethoxysilane, N-phenyl-3-aminopropyltrimethoxysilane, or similar amino-containing alkoxysilanes; 3-mercaptopropyltrimethoxysilane, or similar mercapto-containing alkoxysilanes. Titanate couplings can be exemplified by i-propoxytitane-tri (i-isosterate).

Other arbitrary components may be comprised of tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, or similar alkoxysilanes; hexane, heptane, or similar aliphatic-type solvents; toluene, xylene, or similar aromatic-type solvents, methylethylketone, methylisobutylketone, or similar ketone-type solvents, and other organic solvents; pigments; heat-resistant agents, etc.

A curable silicone composition of the invention is prepared by uniformly mixing components (A), (B), (C), and, if necessary, (D) and other arbitrary components. There are no special restrictions with regard to the method of mixing, but the following methods can be recommended: components (A), (B), (C) and, if necessary (D) and other arbitrary components are mixed simultaneously altogether; components (A) and (B) are premixed and then component (C) and, if necessary, component (D) and other arbitrary components are added; components (A) and (B) and, if necessary, component (D) and other arbitrary components are premixed and then component (C) is added. There are no special restrictions with regard to the equipment that can be used for mixing components (A), (B), (C), and, if necessary, component (D) and other arbitrary components, but it is recommended to use a single-screw or a double-screw continuous-action mixer, two-roll mixer, Ross mixer, Hobart mixer, dental mixer, planetary mixer, or a kneader mixer.

A curable silicone composition of the invention is suitable for transfer molding, injection molding, potting, casting, powdered application, application by dipping, application by dripping, etc. In selecting such processes as potting, screen printing, and spreading, that require the use of the composition in small quantities, the composition can be used in a liquid or a paste-like form. Since the cured body obtained by curing the silicone composition of the invention possesses excellent flexibility and adhesiveness, the composition is suitable for use as a sealing agent, casting agent, coating agent, adhesive agent, or another substance that may be required for electrical and electronic parts.

A curable body produced by curing the silicone composition of the invention possesses flexibility and can be firmly connected as an integral part to a substrate. Due to these features, the composition is suitable for manufacturing protective parts, seals, and adhesive elements.

[Practical Examples]

The invention will now be described with reference to practical examples. The following procedures were used for evaluating and measuring characteristics of the curable compositions and parts molded from these compositions.

[Method of Measuring Viscosity]

This characteristic was measured with the use of type E viscometer (a product of TOKIMEC Co., Digital Viscometer, Model DV-U-E, Type II) at 25° C. and rotation frequency of 2.5 r.p.m..

[Method of Measuring a Coefficient of Thermal Expansion]

A curable silicone composition was loaded into a 4 mm-wide, 15 mm-long, and 4 mm-deep mold cavity, defoamed at 70 mmHg, and then press-cured for 60 min. at a temperature of 150° C. and at a pressure of 2.5 MPa. The product was then subjected to a secondary heat treatment in an oven for 2 hours at 180° C. As a result, it was cured and formed into a cured-body specimen. A coefficient of thermal expansion of the obtained specimen was measured with the use of a thermomechanical analyzer of TMA type (the product of Shinkuriko Co., Ltd., Model TM-9200) by heating from 25° C. to 210° C. with a temperature increase rate of 2.5° C./min.

[Method for Measuring a Composite Modulus of Viscoelasticity]

A curable silicone composition was loaded into a 10 mm-wide, 50 mm-long, and 2 mm-deep mold cavity, defoamed at 70 mmHg, and then press-cured for 60 min. at a temperature of 150° C. and at a pressure of 2.5 MPa. The product was then subjected to secondary heat treatment in an oven for 2 hours at 180° C. As a result, it was cured and formed a cured-body specimen. A composite modulus of viscoelasticity at 25 ° C. of the obtained specimen was measured with the use of an ARES viscoelasticity tester (manufactured by Rheometric Scientific Co.) at the following conditions: twist 0.5%, frequency 1 Hz, temperature increase from −50° C. to 150° C. with the rate of 3° C. /min.

[Method of Evaluating Adhesiveness]

A solder resist (a developing-type solder resist, a product of Taiyo Ink Manufacturing Co., Ltd., PSR-4000 CC02/CA-40 CC02) was applied onto a substrate made from a bismalemide triazine resin (known as BT resin) and subjected to ultraviolet drying, exposing to light, and curing (for 1 hour at 150° C.). As a result, a 50 μm-thick solder resist was formed on the BT substrate. The obtained body was used as an adherend. Other adherends were comprised of a glass plate, aluminum plate, nickel plate, and a copper plate. A curable silicone composition in the amount of 1 cm$^3$ was applied onto the adherend, heat treated in an oven for 2 hours at 125° C., and then heat treated for the second time in an oven for 2 hours at 180° C. As a result, an adhesion-evaluation sample was produced. The cured layer was peeled from the obtained sample by a dental spatula, and adhesion properties were evaluated by visually observing the surface condition under a microscope by using the following evaluation criteria: ○—cohesive failure; Δ—separation along the interface but with some residual material left on the interface surface; X—easy separation along the interface.

[Evaluation of Curability]

A 15 mm-wide, 50 mm-long, and 0.2 mm-deep cavity was formed by laminating five layers of 40 μm-thick tape on a glass plate. The cavity was filled with the curable composition by using a squeegee. The obtained specimen was inserted into a hot-air-circulation oven operating at 150° C., and every 15 minutes the surface of the specimen was contacted by a dental spatula. A criterion was the time that passed from the beginning of the test till the moment when the spatula could be removed from the specimen surface without formation of viscous threads of the sample material.

[Weight-Average Molecular Weight]

A weight-average molecular weight was measured relative to polystyrene by means of gel-permeation chromatography with toluene used as a solvent.

[Practical Example 1]

A curable silicone composition having a viscosity of 15 Pa·s was prepared by uniformly mixing the following components: 25.0 parts by weight of an organopolysiloxane represented by below-given siloxane unit formula (4) having a weight-average molecular weight of 1600, viscosity of 57500 mPa·s, and a phenol equivalent of 317; 14.0 parts by weight of an organopolysiloxane expressed by the below-given formula (5) having a viscosity of 10 mPa·s and an epoxy equivalent of 180 (a mole ratio of phenolic hydroxyl groups contained in the organopolysiloxane of formula (4) to epoxy groups contained in the organopolysiloxane of formula (5) was 1.0); 1.0 part by weight of an encapsulated amine-type catalyst (HX-3088, a product of Asahi Chemical Industry Co., Ltd.; 40% of amine catalyst); and 60.0 parts by weight of a spherical amorphous silica (Admafine, a product of Admatec Co., ltd., average an average particle size: 1.5 μm). The composition was defoamed in vacuum, and then a coefficient of thermal expansion, a composite modulus of viscoelasticity, adhesiveness, and curing time were measured by the methods described above. Results of measurements are shown in Table 1.

$$[Z(CH_3)_2SiO_{1/2}]_{0.6} [C_6H_5SiO_{3/2}]_{0.4} \quad (4),$$

(where Z is a 3-(m-hydroxyphenyl)propyl group), $$X\!-\!(CH_3)_2SiO\,(CH_3)_2\,Si\!-\!X \quad (5),$$

(where X is a 3-glycidoxypropyl group).

[Practical Example 2]

A curable silicone composition having a viscosity of 14 Pa·s was prepared by uniformly mixing the following components: 24.0 parts by weight of an organopolysiloxane represented by above-given siloxane unit formula (4) having a weight-average molecular weight of 1600, viscosity of 57500 mPa·s, and a phenol equivalent of 317; 14.0 parts by weight of an organopolysiloxane expressed by the above-given formula (5) having a viscosity of 10 mPa·s and an epoxy equivalent of 180 (a mole ratio of phenolic hydroxyl groups contained in the organopolysiloxane of formula (4) to epoxy groups contained in the organopolysiloxane of formula (5) was 1.0); 1.0 part by weight of a 3-glycidoxypropyl trimethoxysilane; 1.0 part by weight of HX-3088 (encapsulated amine catalyst, a product of Asahi Chemical Industry Co., Ltd.; 40% of amine catalyst); and 60.0 parts by weight of a spherical amorphous silica (Admafine, a product of Admatec Co., ltd., an average particle size: 1.5 μm). The composition was defoamed in vacuum, and then a coefficient of thermal expansion, a composite modulus of viscoelasticity, adhesiveness, and curing time were measured by the methods described above. Results of measurements are shown in Table 1.

[Practical Example 3]

A curable silicone composition having a viscosity of 57 Pa·s was prepared by uniformly mixing the following components: 23.0 parts by weight of an organopolysiloxane represented by below-given siloxane unit formula (6) having a weight-average molecular weight of 1670, viscosity of 39700 mPa·s, and a phenol equivalent of 300; 15.0 parts by weight of an organopolysiloxane expressed by the above-given formula (5) having a viscosity of 10 mPa·s and an epoxy equivalent of 180 (a mole ratio of phenolic hydroxyl groups contained in the organopolysiloxane of formula (6) to epoxy groups contained in the organopolysiloxane of formula (5) was 1.0); 1.0 part by weight of a 3-glycidoxypropyl trimethoxysilane; 1.0 part by weight of HX-3088 (encapsulated amine catalyst, a product of Asahi Chemical Industry Co., Ltd.; 40% of amine catalyst); and 60.0 parts by weight of a spherical amorphous silica (Admafine, a product of Admatec Co., ltd., an average particle size: 1.5 μm). The composition was defoamed in vacuum, and then a coefficient of thermal expansion, a composite modulus of viscoelasticity, adhesiveness, and curing time were measured by the methods described above. Results of measurements are shown in Table 1.

$$[Z(CH_3)_2SiO_{1/2}]_{0.4} [CH_3]_3SiO_{1/2}]_{0.2} [SiO_{4/2}]_{0.4} \quad (6),$$

(where Z is a 3-(m-hydroxyphenyl)propyl group).

[Comparative Example 1]

A curable silicone composition having a viscosity of 199 Pa·s was prepared by uniformly mixing the following components: 23.0 parts by weight of a bisphenol A type liquid epoxyresin (a product of Japan Epoxy Resin Co., Ltd., Epikote 828, viscosity of 15 mPa·s, and epoxy equivalent of 190); 17.0 parts by weight of a liquid phenol compound (MEH8000H, a product of Meiwa Plastic Industries Ltd.); 1.0 part by weight of HX-3088 (encapsulated amine catalyst, a product of Asahi Chemical Industry Co., Ltd.; 40% of amine catalyst); and 60.0 parts by weight of a spherical amorphous silica (Admafine, a product of Admatec Co., ltd., an average particle size: 1.5 μm). The composition was defoamed in vacuum, and then a coefficient of thermal expansion, a composite modulus of viscoelasticity, adhesiveness, and curing time were measured by the methods described above. Results of measurements are shown in Table 2. It was noticed that the obtained compound had a composite modulus of elasticity equal to 2900 and therefore was very stiff.

[Comparative Example 2]

A curable silicone composition was prepared by uniformly mixing the following components: 2.0 parts by weight of an organopolysiloxane represented by the below-given formula (7), having a viscosity of 3050 mPa·s and a phenol equivalent of 200; 36.0 parts by weight of an organopolysiloxane represented by below-given siloxane unit formula (8) having a weight-average molecular weight of 45000, viscosity of 17700 mPa·s, and an epoxy equivalent of 3850 (a mole ratio of phenolic hydroxyl groups contained in the organopolysiloxane of formula (7) to epoxy groups contained in the organopolysiloxane of formula (8) was 1.0); 1 part by weight of a curing accelerator HX-3088 (encapsulated amine catalyst, a product of Asahi Chemical Industry Co., Ltd.; 40% of amine catalyst); and 60.0 parts by weight of a spherical amorphous silica (Admafine, a product of Admatec Co., ltd., an average particle size: 1.5 μm). Viscosity of the obtained composition exceeded 500 Pa·s. The composition was defoamed in vacuum, and then a coefficient of thermal expansion, a composite modulus of viscoelasticity, adhesiveness, and curing time were measured by the methods described above. Results of measurements are shown in Table 2.

$$Z\!-\!(CH_3)_2SiO\,(CH_3)_2Si\!-\!Z \quad (7)$$

(where Z is a 3-(m-hydroxyphenyl)propyl group).

$$[(CH_3)_3SiO_{1/2}]_{0.003} [XCH_3SiO_{2/2}]_{0.024} [(CH_3)_2SiO_{2/2}]_{0.972} \quad (8),$$

(where X is a 3-glycidoxypropyl group).

[Comparative Example 3]

A curable silicone composition having a viscosity of 27 Pa·s was prepared by uniformly mixing the following components: 17.0 parts by weight of an organopolysiloxane represented by the below-given formula (9) having a weight-average molecular weight of 630, viscosity of 840 mPa·s, and a phenol equivalent of 314; 21.0 parts by weight of an organopolysiloxane represented by below-given siloxane unit formula (10) having a weight-average molecular weight of 1500, viscosity of 1200 mPa·s, and an epoxy equivalent of 370 (a mole ratio of phenolic hydroxyl groups contained in the organopolysiloxane of formula (9) to epoxy groups contained in the organopolysiloxane of formula (10) was 1.0); 1 part by weight of a curing accelerator HX-3088 (encapsulated amine catalyst, a product of Asahi Chemical Industry Co., Ltd.; 40 wt. % of amine catalyst in a capsule of bisphenol-A type liquid epoxy resin); 1 part by weight of a 3-glycidoxypropyl trimethoxysilane; and 70.0 parts by weight of a spherical amorphous silica (Admafine, a product of Admatec Co., Ltd., an average particle size: 1.5 μm). Except that after defoaming in vacuum, the composition was poured into a mold, heat treated in an oven for 2 hours at 150° C. and then for 2 hours at 180° C., the coefficient of thermal expansion and composite modulus of viscoelasticity were tested similarly to the previous examples. Adhesiveness, and curing time also were measured by the same methods as described above. Results of measurements are shown in Table 2.

$$[(C_2H_5)_2SiO_{2/2}]_{0.5} [R^9(CH_3)SiO_{2/2}]_{0.5} \quad (9)$$

In the above formula, $R^9$ is expressed by the following formula:

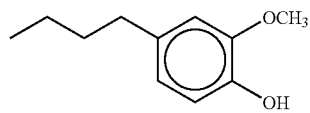

$$[(CH_3)_3SiO_{1/2}]_{0.17} [R^{10}(CH_3)SiO_{2/2}]_{0.33} [(CH_3)_2SiO_{2/2}]_{0.50} \quad (10)$$

In the above formula, $R^{10}$ is expressed by the following formula:

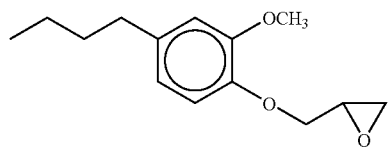

[Comparative Example 4]

A curable silicone composition having a viscosity of 81 Pa·s was prepared by uniformly mixing the following components: 22.0 parts by weight of an organopolysiloxane represented by the aforementioned formula (9) having a weight-average molecular weight of 630, viscosity of 840 mPa·s, and a phenol equivalent of 314; 16.0 parts by weight of an organopolysiloxane represented by below-given siloxane unit formula (11) having a weight-average molecular weight of 950, viscosity of 177000 mPa·s, and an epoxy equivalent of 240 (a mole ratio of phenolic hydroxyl groups contained in the organopolysiloxane of formula (9) to epoxy groups contained in the organopolysiloxane of formula (11) was 1.0); 1 part by weight of a curing accelerator HX-3088 (encapsulated amine catalyst, a product of Asahi Chemical Industry Co., Ltd.; 40 wt. % of amine catalyst in a capsule of bisphenol-A type liquid epoxy resin); 1 part by weight of a 3-glycidoxypropyl trimethoxysilane; and 70.0 parts by weight of a spherical amorphous silica (Admafine, a product of Admatec Co., Ltd., an average particle size: 1.5 μm). Except that after defoaming in vacuum, the composition was poured into a mold, heat treated in an oven for 2 hours at 150° C. and then for 2 hours at 180° C., the coefficient of thermal expansion and composite modulus of viscoelasticity were tested similarly to the previous examples. Adhesiveness, and curing time also were measured by the same methods as described above. Results of measurements are shown in Table 2.

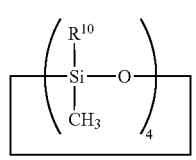

(11)

In this formula, $R^{10}$ is expressed as follows:

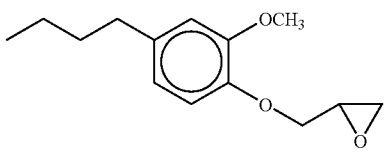

[Comparative Example 5]

A curable silicone composition having a viscosity of 5 Pa·s was prepared by uniformly mixing the following components: 20.0 parts by weight of an organopolysiloxane represented by the aforementioned formula (7) having viscosity of 3050 mPa·s and a phenol equivalent of 200; 17.0 parts by weight of an organopolysiloxane represented by below-given siloxane unit formula (12) having a weight-average molecular weight of 696, viscosity of 110 mPa·s, and an epoxy equivalent of 174 (a mole ratio of phenolic hydroxyl groups contained in the organopolysiloxane of formula (7) to epoxy groups contained in the organopolysiloxane of formula (12) was 1.0); 1 part by weight of a curing accelerator HX-3088 (encapsulated amine catalyst, a product of Asahi Chemical Industry Co., Ltd.; 40 wt. % of amine catalyst); and 60.0 parts by weight of a spherical amorphous silica (Admafine, a product of Admatec Co., Ltd., an average particle size: 1.5 μm). A coefficient of thermal expansion, a composite modulus of viscoelasticity, adhesiveness, and curing time were measured by the methods described above. Results of measurements are shown in Table 2.

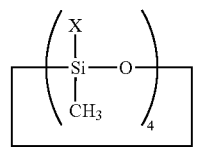

(12)

In this formula, X is 3-glycidoxypropyl group.

TABLE 1

|  | Pr. Ex. 1 | Pr. Ex. 2 | Pr. Ex. 3 |
| --- | --- | --- | --- |
| Viscosity (Pa · s) | 15 | 14 | 57 |
| Coef. of thermal expansion (ppm/° C.) | 110 | 110 | 100 |
| Composite modulus of viscoelasticity (MPa) | 80 | 86 | 90 |
| Adhesiveness (solder resist) | ◯ | ◯ | ◯ |
| Adhesiveness (nickel) | ◯ | ◯ | ◯ |
| Adhesiveness (copper) | ◯ | ◯ | ◯ |
| Adhesiveness (aluminum) | ◯ | ◯ | ◯ |
| Adhesiveness (glass) | ◯ | ◯ | ◯ |
| Curing time (min) | 45 | 45 | 30 |

TABLE 2

| | | Comp. Ex. 1 | Comp. Ex. 2 | Comp. Ex. 3 | Comp. Ex. 4 | Comp. Ex. 5 |
|---|---|---|---|---|---|---|
| Viscosity | (Pa·s) | 199 | >500 | 27 | 81 | 5 |
| Coef. of thermal expansion | (ppm/°C.) | 67 | —* | 130 | 80 | 120 |
| Composite modulus of viscoelasticity | (MPa) | 2900 | —* | 60 | 350 | 80 |
| Adhesiveness | (solder resist) | ○ | X | ○ | ○ | X |
| Adhesiveness | (nickel) | ○ | X | ○ | ○ | X |
| Adhesiveness | (copper) | ○ | X | ○ | ○ | X |
| Adhesiveness | (aluminum) | ○ | X | ○ | ○ | ○ |
| Adhesiveness | (glass) | ○ | X | ○ | ○ | ○ |
| Curing time | (min) | 30 | 90 | 120 | 120 | 15 |

*cured bodies were too brittle to evaluate.

Industrial Applicability

Since the curable silicone composition of the invention is comprised of: (A) an organopolysiloxane that has a branched molecular structure and contains in one molecule at least two univalent hydrocarbon groups with phenolic hydroxyl groups therein; (B) a linear-chain organopolysiloxane having at least two univalent hydroxyl groups with epoxy groups that are free of aromatic rings; (C) a curing accelerator, and, if necessary, (D) a filler, it is characterized by speedy curing, and requires either shorter time for molding, or a reduced curing temperature. In other words, since under the effect of thermal expansion that occurs during molding the composition develops reduced internal stress, it can be used as a protective material for delicate, fragile and weak parts and, hence, can protect these parts from damage. Furthermore, the composition provides strong adhesion to substrates. For example the composition showed strong adhesion to solder resists, nickel, copper, and other difficult-to-adhere substrates. Therefore, the composition is suitable for use as a sealing material, casting agent, coating agent, adhesive agents, etc., for electrical parts and electronic elements. The cured bodies obtained from the composition can be firmly connected to substrates to form an integral structure and, at the same time, possess adequate flexibility.

The invention claimed is:

1. A curable silicone composition comprising:
   (A) an organopolysiloxane that has a branched molecular structure and contains in one molecule at least two univalent hydrocarbon groups with phenolic hydroxyl groups therein;
   (B) a linear-chain organopolysiloxane having at least two univalent hydrocarbon groups with epoxy groups that are free of aromatic rings; and
   (C) a curing accelerator.

2. The curable silicone composition of claim 1, further comprising a filler (D).

3. The curable silicone composition according to claim 1, wherein said component (A) is represented by the following silicone unit formula (1):

$$[R^1{}_3SiO_{1/2}]_a [R^2{}_2SiO_{2/2}]_b [R^3SiO_{3/2}]_c \tag{1}$$

(where $R^1$, $R^2$, and $R^3$ are $C_{1-20}$ organic groups, at least two of which are univalent hydrocarbon groups with phenolic hydroxyl groups; <<a+b+c=1>>; <<a>>, on average, satisfies the following condition: <<0≦a≦0.8>>, <<b>>, on average, satisfies the following condition: <<0≦b≦0.8>>, and, <<c>>, on average, satisfies the following condition: <<0.2≦c≦1.0>>).

4. The curable silicone composition according to claim 1, wherein said component (A) is represented by the following silicone unit formula (2):

$$[R^4{}_3SiO_{1/2}]_d [R^5{}_2SiO_{2/2}]_e [SiO_{4/2}]_f \tag{2}$$

(where $R^4$, $R^5$ are $C_{1-20}$ organic groups, at least two of which are univalent hydrocarbon groups with phenolic hydroxyl groups; <<d+e+f=1>>; <<d/f>>, on average, satisfies the following condition: <<0.02≦d/f≦4>>, <<d>>, on average, satisfies the following condition: <<0<d≦0.8>>, <<e>>, on average, satisfies the following condition: <<0≦e≦0.98>>, and <<f>>, on average, satisfies the following condition: <<0.002≦f≦0.98>>).

5. The curable silicone composition according to claim 1, wherein said component (A) is a liquid.

6. The curable silicone composition of claim 3, wherein in said formula (1) that represents component (A), <<a>> satisfies the following condition: <<0<a≦0.8>> and <<b>> is equal to 0.

7. The curable silicone composition according to claim 1, wherein said component (B) is an organopolysiloxane represented by the following structural formula (3):

$$R^7{}_3SiO(R^8{}_2SiO)_m SiR^7{}_3 \tag{3}$$

(wherein $R^7$ and $R^8$ are the same or different $C_{1-20}$ organic groups, at least two of which are univalent hydrocarbon groups with epoxy groups that are free of aromatic rings, and <<m>> is an integer between 0 and 1000).

8. The curable silicone composition according to claim 1, wherein component (B) is used in an amount of 1 to 1000 parts by weight, and component (C) is used in an amount of 0.01 to 100 parts by weight per 100 parts by weight of component (A).

9. The curable silicone composition according to claim 1, wherein said univalent hydrocarbon group with epoxy group of said component (B) is an alkyl group bonded to a glycidoxy group or an alkyl group bonded to 3,4-epoxycyclohexyl group.

10. The curable silicone composition according to claim 1, which is a liquid or a paste.

11. A cured product obtained by curing a curable silicone composition as claimed in claim 1.

12. The curable silicone composition according to claim 2, wherein said component (A) is represented by the following silicone unit formula (1):

$$[R^1{}_3SiO_{1/2}]_a [R^2{}_2SiO_{2/2}]_b [R^3SiO_{3/2}]_c \tag{1}$$

(where $R^1$, $R^2$, and $R^3$ are $C_{1-20}$ organic groups, at least two of which are univalent hydrocarbon groups with phenolic hydroxyl groups; <<a+b+c=1>>; <<a>>, on average, satisfies the following condition: <<0≦a≦0.8>>, <<b>>, on average, satisfies the following condition: <<0≦b≦0.8>>, and, <<c>>, on average, satisfies the following condition: <<0.2≦c≦1.0>>).

13. The curable silicone composition according to claim 2, wherein said component (A) is represented by the following silicone unit formula (2):

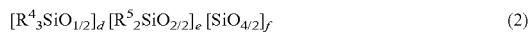 (2)

(where $R^4$, $R^5$ are $C_{1-20}$ organic groups, at least two of which are univalent hydrocarbon groups with phenolic hydroxyl groups; <<d+e+f=1>>; <<d/f>>, on average, satisfies the following condition: <<0.02≦d/f≦4>>, <<d>>, on average, satisfies the following condition: <<0<d≦0.8>>, <<e>>, on average, satisfies the following condition: <<0≦e≦0.98>>, and <<f>>, on average, satisfies the following condition: <<0.002≦f≦0.98>>).

14. The curable silicon composition according to claim 2, wherein said component (A) is a liquid.

15. The curable silicone composition of claim 12, wherein in said formula (1) that represents component (A), <<a>> satisfies the following condition: <<0<a≦0.8>> and <<b>> is equal to 0.

16. The curable silicone composition according to claim 2, wherein said component (B) is an organopolysiloxane represented by the following structural formula (3):

 (3)

(wherein $R^7$ and $R^8$ are the same or different $C_{1-20}$ organic groups, at least two of which are univalent hydrocarbon groups with epoxy groups that are free of aromatic rings, and <<m>> is an integer between 0 and 1000).

17. The curable silicone composition according to claim 2, wherein component (B) is used in an amount of 1 to 1000 parts by weight, and component (C) is used in an amount of 0.01 to 100 parts by weight per 100 parts by weight of component (A).

18. The curable silicone composition according to claim 2, wherein said univalent hydrocarbon group with epoxy group of said component (B) is an alkyl group bonded to a glycidoxy group or an alkyl group bonded to 3,4-epoxycyclohexyl group.

19. The curable silicone composition according to claim 2, which is a liquid or a paste.

* * * * *